US010453586B2

(12) United States Patent
Yu et al.

(10) Patent No.: US 10,453,586 B2
(45) Date of Patent: Oct. 22, 2019

(54) COLD SHRINK ARTICLE FOR ELECTRICAL DEVICE

(71) Applicant: Dow Global Technologies LLC, Midland, MI (US)

(72) Inventors: Haiyang Yu, Shanghai (CN); Yanli Huo, Croylaan (BE); Mohamed Esseghir, Lawrenceville, NJ (US); Saurav S. Sengupta, Collegeville, PA (US); Jeffrey M. Cogen, Flemington, NJ (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/276,902

(22) Filed: Feb. 15, 2019

(65) Prior Publication Data

US 2019/0180890 A1    Jun. 13, 2019

Related U.S. Application Data

(62) Division of application No. 15/322,257, filed as application No. PCT/CN2014/080971 on Jun. 27, 2014.

(51) Int. Cl.
| | |
|---|---|
| *H01B 3/44* | (2006.01) |
| *C08K 5/57* | (2006.01) |
| *C08L 23/16* | (2006.01) |
| *C08L 23/26* | (2006.01) |
| *C08K 5/14* | (2006.01) |
| *C08L 83/00* | (2006.01) |
| *B32B 27/08* | (2006.01) |
| *B32B 27/20* | (2006.01) |
| *B32B 27/22* | (2006.01) |
| *B32B 27/28* | (2006.01) |
| *B32B 27/32* | (2006.01) |
| *C08L 83/04* | (2006.01) |
| *H01B 3/46* | (2006.01) |
| *H01R 4/70* | (2006.01) |
| *C08G 77/16* | (2006.01) |
| *C08G 77/20* | (2006.01) |

(52) U.S. Cl.
CPC ............ *H01B 3/441* (2013.01); *B32B 27/08* (2013.01); *B32B 27/20* (2013.01); *B32B 27/22* (2013.01); *B32B 27/283* (2013.01); *B32B 27/32* (2013.01); *C08K 5/14* (2013.01); *C08K 5/57* (2013.01); *C08L 23/16* (2013.01); *C08L 23/26* (2013.01); *C08L 83/00* (2013.01); *C08L 83/04* (2013.01); *H01B 3/46* (2013.01); *H01R 4/70* (2013.01); *B32B 2264/102* (2013.01); *B32B 2264/104* (2013.01); *B32B 2270/00* (2013.01); *B32B 2307/206* (2013.01); *B32B 2307/54* (2013.01); *B32B 2307/736* (2013.01); *B32B 2457/00* (2013.01); *C08G 77/16* (2013.01); *C08G 77/20* (2013.01); *C08L 2203/206* (2013.01); *C08L 2205/02* (2013.01); *C08L 2205/03* (2013.01); *C08L 2205/05* (2013.01)

(58) Field of Classification Search
CPC .. H01B 3/441; H01B 3/46; H01R 4/70; B32B 27/08; B32B 27/20; B32B 27/22; B32B 27/283; B32B 27/32; B32B 2307/206; B32B 2270/00; B32B 2264/104; B32B 2264/102; B32B 2307/54; B32B 2307/736; B32B 2457/00; C08L 83/04; C08L 23/26; C08L 23/16; C08L 83/00; C08L 2205/05; C08L 2205/03; C08L 2205/02; C08L 2203/206; C08G 77/20; C08G 77/16; C08K 5/57; C08K 5/14
USPC ........................................................ 524/504
See application file for complete search history.

(56) References Cited

U.S. PATENT DOCUMENTS

| | | | |
|---|---|---|---|
| 4,363,842 | A | 12/1982 | Nelson |
| 5,171,940 | A | 12/1992 | Vallauri |
| 5,246,783 | A | 9/1993 | Spenadel et al. |
| 5,266,627 | A | 11/1993 | Meverden et al. |
| 5,272,236 | A | 12/1993 | Lai et al. |
| 5,278,272 | A | 1/1994 | Lai et al. |
| 5,911,940 | A | 6/1999 | Walton et al. |
| 5,985,062 | A | 11/1999 | Vallauri et al. |
| 5,986,028 | A | 11/1999 | Lai et al. |
| 6,111,200 | A | 8/2000 | De Schrijver et al. |
| 6,124,370 | A | 9/2000 | Walton et al. |
| 6,496,629 | B2 | 12/2002 | Ma et al. |
| 6,714,707 | B2 | 3/2004 | Rossi et al. |
| 6,761,976 | B2 | 7/2004 | Cottevieill et al. |
| 6,838,512 | B2 | 1/2005 | Eggers et al. |
| 7,355,089 | B2 | 4/2008 | Chang et al. |
| 7,553,894 | B2 | 6/2009 | Bandyopadhyay et al. |
| 7,553,920 | B2 | 6/2009 | Tonge |
| 7,642,460 | B2 | 1/2010 | Bandyopadhyay |
| 7,705,085 | B2 | 4/2010 | Bandyopadhyay |
| 9,595,365 | B2 | 3/2017 | Esseghir et al. |
| 2002/0160209 | A1 | 10/2002 | Cottevieille et al. |
| 2005/0214491 | A1 | 9/2005 | Vora |
| 2008/0156528 | A1 | 7/2008 | Campbell et al. |
| 2008/0281032 | A1 | 11/2008 | Bandyopadhyay |
| 2010/0076144 | A1 | 3/2010 | Moore et al. |
| 2012/0171496 | A1 | 7/2012 | Esseghir et al. |
| 2015/0200038 | A1 | 7/2015 | Esseghir et al. |

FOREIGN PATENT DOCUMENTS

| | | |
|---|---|---|
| CN | 101544834 A | 9/2009 |
| WO | 2006/007268 A1 | 1/2006 |

*Primary Examiner* — Angela C Scott

(74) *Attorney, Agent, or Firm* — Husch Blackwell LLP

(57) ABSTRACT

A cold shrink article comprising a shaped, stretched and cured composition comprising (i) a blend of silane-grafted ethylene-α-olefin elastomer and a hydroxyl-terminated polyorganosiloxane, (ii) a vinyl-terminated silicone rubber, and (iii) an ethylene-α-olefin elastomer.

2 Claims, No Drawings

COLD SHRINK ARTICLE FOR ELECTRICAL DEVICE

FIELD OF THE INVENTION

This invention relates to wire and cable accessories, such as splices and terminations.

BACKGROUND OF THE INVENTION

Various technologies exist for the installation of cable accessories (e.g., splices, terminations). Cold shrink type accessories are preferred over pre-molded push-on and heat shrink products since a relatively insignificant physical force is required for installation as compared to the push-on type, and no heating is required versus the heat-shrink type. With the cold shrink approach, the part (e.g. a cable splice) is factory pre-stretched unto a solid removable core, and it slides freely onto the cable. During installation, once the metal conductors are joined together for electrical continuity, the splice is properly positioned at the center of the connection and the removable core (e.g. a plastic spiral core) is removed allowing the rubbery splice to shrink into place in the radial direction for a tight fit over the cable. One key requirement for this technology is the elastic recovery of the article once installed to ensure a tight seal in order to prevent moisture ingress into the electrical connection.

Cold Shrink accessories are generally manufactured from crosslinked silicone rubber which exhibits excellent elastic recovery. Both high temperature vulcanized (HTV) gums and liquid silicone rubber (LSR) are used. However, end users (e.g., electrical utilities) have reported deficiency in tear strength which leads to rapid tear propagation if the connector is nicked during installation or comes into contact with a sharp object during its service life. Many of the applications involve buried cable, e.g., underground installation. Another deficiency of silicone rubber is its relatively lower dielectric strength as compared to an olefin elastomer for example.

SUMMARY OF THE INVENTION

This invention is a new cold shrink accessories technology that delivers the required elastic recovery for a tight connection but with improved tensile and tear resistance as well as dielectric strength for higher connection reliability and potentially slimmer designs. The invention uses reactively compatibilized olefin-silicone rubber compounds that delivers an improved balance of mechanical and electrical properties of the cold shrink article at a reduced overall cost.

In one embodiment the invention is a composition comprising:
(A) Blend of silane-grafted ethylene-α-olefin elastomer and a hydroxyl-terminated polyorganosiloxane;
(B) 70 or more, or greater than 70 to 95, or 75 to 90, or 78 to 85, weight percent (wt %), based on the weight of the composition, of a vinyl-terminated silicone rubber;
(C) Crosslinking catalyst;
(D) Ethylene-α-olefin elastomer; and
(E) Optionally, one or more of an additive and filler.
In one embodiment an additive is present, and it is at least one of a plasticizer, wax, cure promoter, adhesion promoter and scorch inhibitor.

In one embodiment the invention is a process for making a cold shrink article, the process comprising the steps of:
(1) Forming a homogeneous composition comprising:
(A) Blend of silane-grafted ethylene-α-olefin elastomer and a hydroxyl-terminated polyorganosiloxane;
(B) 70 or more, or greater than 70 to 95, or 75 to 90, or 78 to 85, wt %, based on the weight of the composition, of a vinyl-terminated silicone rubber;
(C) Crosslinking catalyst;
(D) Ethylene-α-olefin elastomer; and
(E) Optionally, one or more of an additive and filler;
(2) Forming the homogeneous composition into a shaped article;
(3) At least partially curing the shaped article;
(4) Degassing the at least partially cured shaped article;
(5) Stretching the cured, shaped article; and
(6) Maintaining the stretched, cured, shaped article in a stretched state.
In one embodiment an additive is present, and it is at least one of a plasticizer, wax, cure promoter, adhesion promoter and scorch inhibitor. In one embodiment the cured, stretched shaped article is maintained in the stretched state by mechanical means, e.g., a plastic spiral core. In one embodiment the cured, stretched shaped article is maintained in the stretched state until the article is put into its intended use.

In one embodiment the invention is a cold shrink article made from a composition comprising:
(A) Blend of silane-grafted ethylene-α-olefin elastomer and a hydroxyl-terminated polyorganosiloxane;
(B) 70 or more, or greater than 70 to 95, or 75 to 90, or 78 to 85, wt %, based on the weight of the composition, of a vinyl-terminated silicone rubber;
(C) Crosslinking catalyst;
(D) Ethylene-α-olefin elastomer; and
(E) Optionally one or more of an additive and filler.
In one embodiment the cold shrink article is a cold shrink splice. In one embodiment an additive is present, and it is at least one of a plasticizer, wax, cure promoter, adhesion promoter and scorch inhibitor. In one embodiment the cold shrink article is stretched and maintained in a stretched state by mechanical means, e.g., a plastic spiral core.

In one embodiment the invention is a cold shrink article comprising a shaped, stretched and cured composition comprising (i) a blend of silane-grafted ethylene-α-olefin elastomer and a hydroxyl-terminated polyorganosiloxane, (ii) a vinyl-terminated silicone rubber, and (iii) an ethylene-α-olefin elastomer. In one embodiment the article further comprises at least one of an additive and filler. In one embodiment the cold shrink article is a cold shrink splice. In one embodiment an additive is present, and it is at least one of a plasticizer, wax, cure promoter, adhesion promoter and scorch inhibitor. In one embodiment the cold shrink article is stretched and maintained in a stretched state by mechanical means, e.g., a plastic spiral core.

In one embodiment the invention is a cable having an external layer and comprising a cold shrink splice, the splice shrunk about and in contact with the external layer of the cable and comprising a shaped and cured composition, the composition comprising (i) a blend of silane-grafted ethylene-α-olefin elastomer and a hydroxyl-terminated polyorganosiloxane, (ii) a vinyl-terminated silicone rubber, and (iii) an ethylene-α-olefin elastomer. In one embodiment an additive is present in the composition of the splice, and the additive is at least one of a plasticizer, wax, cure promoter, adhesion promoter and scorch inhibitor.

DETAILED DESCRIPTION OF THE PREFERRED EMBODIMENT

Definitions

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of U.S. patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of Si-g-ethylene-α-olefin elastomer, silicone rubber, crosslinking catalyst, ethylene-α-olefin elastomer, additives and filler in the composition, and the various characteristics and properties by which these components are defined.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds.

The term "or", unless stated otherwise, refers to the listed members individually as well as in any combination.

"Composition" and like terms mean a mixture or blend of two or more components.

"Blend," "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" means a polymeric compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, homogeneous, heterogeneous, etc. The terms "ethylene/α-olefin polymer" and "propylene/.alpha.-olefin polymer" are indicative of interpolymers as described below.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Elastomer" and like terms means a rubber-like polymer that can be stretched to at least twice its original length and which retracts very rapidly to approximately its original length when the force exerting the stretching is released. An elastomer has an elastic modulus of about 10,000 psi (68.95 MPa) or less and an elongation usually greater than 200% in the uncrosslinked state at room temperature using the method of ASTM D638-72.

"Ethylene-α-olefin elastomer" and like terms mean an elastomeric polymer comprising at least 50 mol % units derived from ethylene and between greater than zero and 50 mol % of units derived from an α-olefin, e.g., propylene, butene, hexene, octene, etc. "Derived from" means, in the context of this definition, that the units in the polymer backbone and/or polymer branches are a result of the polymerization or copolymerization of the monomers from which the polymer is made.

"Crosslinked", "cured" and similar terms mean that the polymer, before or after it is shaped into an article, was subjected or exposed to a treatment which induced crosslinking and has xylene or decalene extractables between 10 and 100 weight percent (i.e., a gel content of 0-90%).

"Cable" and like terms mean at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Cold shrink" and like terms refer to an open ended sleeve, made primarily from elastomers with high-performance physical properties, that has been factory expanded, or pre-stretched, and assembled onto a supporting removable plastic core. Cold shrink tubing shrinks upon removal of that supporting core during the installation process. In one embodiment, an electrician slides the tube over a cable to be spliced or terminated and unwinds the core, causing the tube to collapse down, or contract, in place.

Silane-Grafted Ethylene-α-Olefin Elastomer (Si-g-Ethylene-α-Olefin Elastomer) Ethylene-α-Olefin Elastomers The Si-g-ethylene-α-olefin elastomer that is blended with hydroxyl-terminated polyorganosiloxane to form the first (i.e., A) component of the composition of this invention is an interpolymer of ethylene and an α-olefin and that has been grafted with a silane. Examples of the pre-grafted ethylene-α-olefin interpolymers are the ethylene/α-olefin interpolymers in which the α-olefin is typically a $C_{3-20}$, more typically a $C_{3-12}$ and even more typically a $C_{3-8}$, linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, a-methylstyrene, etc.) are α-olefins for purposes of this invention. Illustrative polyethylene copolymers include ethylene/propylene, ethylene/butene, ethylene/1-hexene, ethylene/1-octene, ethylene/styrene, and the like. Illustrative terpolymers include ethylene/propylene/1-octene, ethyl ene/propyl ene/butene, ethylene/butene/1-octene, and ethylene/butene/styrene. The copolymers can be random or blocky.

More specific examples of pre-grafted ethylene-α-olefin elastomers useful in this invention include very low density polyethylene (VLDPE) (e.g., FLEXOMER™ ethylene/1-hexene polyethylene made by The Dow Chemical Company), homogeneously branched, linear ethylene/α-olefin copolymers (e.g. TAFMER™ by Mitsui Petrochemicals Company Limited and EXACT™ by Exxon Chemical Company), homogeneously branched, substantially linear ethylene/α-olefin polymers (e.g., AFFINITY™ and ENGAGE™ polyethylene available from The Dow Chemical Company), and olefin block copolymers such as those described in U.S. Pat. No. 7,355,089 (e.g., INFUSE™ available from The Dow Chemical Company). The more preferred pre-grafted ethylene-α-olefin elastomers are the homogeneously branched linear and substantially linear ethylene-α-olefin elastomers. The substantially linear ethylene-α-olefin elastomers are especially preferred, and are more fully described in U.S. Pat. Nos. 5,272,236, 5,278,272 and 5,986,028.

Blends of any of the above ethylene-α-olefin elastomers can also be used as the component that is grafted with a silane and then blended with the polyorganosiloxane to form the first component of the composition of this invention, and the ethylene-α-olefin elastomers can be blended or diluted with one or more other polymers to the extent that, in a preferred mode, the ethylene-α-olefin elastomers that are silane-grafted and then used to form the blend with the polyorganosiloxane constitute at least about 50, preferably at least about 75 and more preferably at least about 80, weight percent (wt %) of the silane-grafted ethylene-α-olefin elastomer component that is blended with the polyorganosiloxane.

The ethylene-α-olefin elastomers useful in the practice of this invention typically have, before grafting, a density of less than 0.925, more typically less than 0.915, and even more typically less than 0.905, grams per cubic centimeter ($g/cm^3$). The ethylene-α-olefin elastomers typically have a density greater than 0.85, more typically greater than 0.86 and even more typically greater than 0.865, $g/cm^3$. Density is measured by the procedure of ASTM D-792. Generally, the greater the α-olefin content of the elastomer, the lower the density and the more amorphous the elastomer. Low density polyolefin interpolymers are generally characterized as semi-crystalline, flexible and having good optical properties, e.g., high transmission of visible and UV-light and low haze.

Silane and Silane Grafting

The ethylene-α-olefin elastomer is grafted with a silane before blending with the polyorganosiloxane to form the Si-g-ethylene-α-olefin elastomer/polyorganosiloxane blend component of the composition of this invention. A Si-g-ethylene elastomer as used herein is an ethylene elastomer as described above that is grafted with at least one silane compound.

In an embodiment, the Si-g-ethylene-α-olefin elastomer has a molecular weight distribution from about 1 to 7, or from 1.5 to 6, or from 2 to 5.

In an embodiment, the Si-g-ethylene-α-olefin elastomer has a density from 0.855 g/cc to 0.955 g/cc, or from 0.86 g/cc to 0.90 g/cc, or from 0.865 g/cc to 0.895 g/cc.

In an embodiment, the amount of silane used in the grafting reaction is greater than, or equal to, 0.05 parts per hundred ("phr" based on the amount of the ethylene-α-olefin elastomer), or from 0.5 phr to 6 phr, or from 0.5 phr to 4 phr.

In an embodiment the amount of amount of initiator used in the grafting reaction is less than, or equal to, 4 millimoles radicals per 100 grams ethylene-α-olefin elastomer, or less than, or equal to, 2 millimoles radicals per 100 grams ethylene-α-olefin elastomer, or less than, or equal to, 1 millimoles radicals per 100 grams ethylene-α-olefin elastomer.

In an embodiment the amount of silane constituent grafted on the ethylene-α-olefin elastomer chain is greater than, or equal to, 0.05 wt % (based on the weight of the ethylene-α-olefin elastomer), as determined by FTIR analysis, or other appropriate method. In a further embodiment this amount is greater than, or equal to, 0.5 wt %, and in yet a further embodiment this amount is greater than, or equal to, 1.2 wt %. In an embodiment the amount silane constituent grafted on the ethylene-α-olefin elastomer is from 0.5 wt % to 5.0 wt %.

Suitable silanes include, but are not limited to, those of the general formula (I):

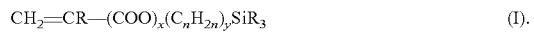

$$CH_2=CR-(COO)_x(C_nH_{2n})_y SiR_3 \qquad (I).$$

In this formula, R is a hydrogen atom or methyl group; x and y are 0 or 1, with the proviso that when x is 1, y is 1; n is an integer from 1 to 12 inclusive, or 1 to 4, and each R' independently is an organic group, including, but not limited to, an alkoxy group having from 1 to 12 carbon atoms (e.g. methoxy, ethoxy, butoxy), an aryloxy group (e.g. phenoxy), an araloxy group (e.g. benzyloxy), an aliphatic or aromatic siloxy group, an aromatic acyloxyl group, an aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms.

In an embodiment the silane compound is selected from vinyltrialkoxysilanes, vinyltriacyloxysilanes or vinyltrichlorosilane. In addition any silane, or mixtures of silanes, which will effectively graft to, and/or crosslink, the ethylene-α-olefin elastomer can be used in the practice of this invention. Suitable silanes include unsaturated silanes that comprise both an ethylenically unsaturated hydrocarbyl group, such as a vinyl, allyl, isopropenyl, butenyl, cyclohexenyl or γ-(meth) acryloxy allyl group, and a hydrolyzable group, such as, a hydrocarbyloxy, hydrocarbonyloxy, or hydrocarbylamino group, or a halide. Examples of hydrolyzable groups include methoxy, ethoxy, formyloxy, acetoxy, proprionyloxy, chloro, and alkyl or arylamino groups. Preferred silanes are the unsaturated alkoxy silanes which can be grafted onto the elastomer. These silanes and their method of preparation are more fully described in U.S. Pat. No. 5,266,627 to Meverden, et al.

In an embodiment silanes include vinyltrimethoxysilane (VTMS), vinyltriethoxysilane, 3-(trimethoxysilyl)propyl methacrylate (γ-(meth)acryloxypropyl trimethoxysilane), and mixtures thereof.

The silane can be grafted to the ethylene-α-olefin elastomer by any conventional method, typically in the presence of a free radical initiator, for example peroxides and azo compounds, etc., or by ionizing radiation. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy)hexane, lauryl peroxide, and tert-butyl peracetate. A suitable azo compound is 2,2'-azobis (isobutyronitrile).

The amount of initiator and silane employed will affect the final structure of the silane grafted ethylene-α-olefin elastomer, such as, for example, the degree of grafting in the grafted elastomer and the degree of crosslinking in the cured elastomer. The resulting structure, will in turn, affect the physical and mechanical properties of the final product. Typically, the amount of initiator and silane employed will not exceed that which is determined to provide the desired level of crosslinking, and the resulting properties in the elastomer.

The grafting reaction should be performed under conditions that maximize grafts onto the elastomer (polymer) backbone, and minimize side reactions, such as the homopolymerization of grafting agent, which is not grafted to the polymer. Some silane agents undergo minimal or no homopolymerization, due to steric features in the molecular structure, low reactivity and/or other reasons.

Hydroxyl-Terminated Polyorganosiloxane (OH-Terminated Polyorganosiloxane)

The OH-terminated polyorganosiloxane component of the Si-g-ethylene-α-olefin/OH-terminated polyorganosiloxane blend that is the first or A component of the composition of this invention typically has an average unit formula $R_aSiO_{(4-n)/2}$ which may have a linear or partially-branched structure but is preferably linear. Each R may be the same or different. R is a substituted or non-substituted monovalent hydrocarbon group which may be, for example, an alkyl group, such as a methyl, ethyl, propyl, butyl, and octyl groups; aryl groups such as phenyl and tolyl groups; aralkyl groups; alkenyl groups, for example, vinyl, allyl, butenyl, hexenyl, and heptenyl groups; and halogenated alkyl groups, for example chloropropyl and 3,3,3-trifluoropropyl groups. The polyorganosiloxane is terminated with one or more hydroxyl groups. When R is an alkenyl group, the alkenyl group is preferably a vinyl group or hexenyl group, and most preferably a vinyl group. Indeed alkenyl groups may be present in the polyorganosiloxane on terminal groups and/or polymer side chains.

Representative OH-terminated polyorganosiloxane include, but are not limited to, hydroxyl-terminated polydimethylsiloxane, hydroxyl-terminated polydimethylsiloxane, hydroxyl-terminated copolymer of methylvinylsiloxane and dimethylsiloxane, hydroxyl-terminated copolymer of methylvinylsiloxane and dimethylsiloxane, hydroxyl-terminated polydimethylsiloxane, hydroxyl-terminated copolymer of methylvinylsiloxane and dimethylsiloxane, hydroxyl-terminated copolymer of methylvinylsiloxane and dimethyl siloxane, hydroxyl-terminated polydimethylsiloxane, hydroxyl-terminated copolymer of methylhexenyl siloxane and dimethylsiloxane, hydroxyl-terminated copolymer of methylhexenyl siloxane and dimethylsiloxane, hydroxyl-terminated copolymer of methylphenylsiloxane and dimethylsiloxane, hydroxyl-terminated copolymer of methylphenyl siloxane and dimethylsiloxane, hydroxyl-terminated copolymer of methyl(3,3,3-trifluoropropyl)siloxane and dimethylsiloxane, and hydroxyl-terminated copolymer of methyl(3,3,3-trifluoropropyl)siloxane and dimethyl siloxane.

Blend of Si-g-Ethylene-α-Olefin Elastomer and OH-Terminated Polyorganosiloxane

The blend of Si-g-ethylene-α-olefin elastomer and OH-terminated polyorganosiloxane typically comprises from 90 to 99.5, more typically from 93 to 99 and even more typically from 97 to 95, wt % Si-g-ethylene-α-olefin elastomer. The blend of Si-g-ethylene-α-olefin elastomer and OH-terminated polyorganosiloxane typically comprises from 0.5 to 10, more typically from 1 to 7 and even more typically from 3 to 5, wt % OH-terminated polyorganosiloxane. Although the blend can contain one or more other components as described above, typically and preferably the only two components of the blend are the Si-g-ethylene-α-olefin elastomer and OH-terminated polyorganosiloxane.

Vinyl-Terminated Silicone Rubber

The vinyl-terminated silicone rubber component of the compositions of this invention are polyorganosiloxanes as described above except comprising at least one terminal vinyl group rather than at least one terminal hydroxyl group. Representative vinyl-terminated silicone rubbers include, but are not limited to, vinyl-terminated polydimethylsiloxane, vinyl-terminated polydimethylsiloxane, vinyl-terminated copolymer of methylvinylsiloxane and dimethylsiloxane, vinyl-terminated copolymer of methylvinylsiloxane and dimethylsiloxane, vinyl-terminated polydimethylsiloxane, vinyl-terminated copolymer of methylvinylsiloxane and dimethylsiloxane, vinyl-terminated copolymer of methylvinylsiloxane and dimethylsiloxane, vinyl-terminated polydimethylsiloxane, vinyl-terminated copolymer of methylhexenylsiloxane and dimethylsiloxane, vinyl-terminated copolymer of methylhexenylsiloxane and dimethylsiloxane, vinyl-terminated copolymer of methylphenylsiloxane and dimethylsiloxane, vinyl-terminated copolymer of methylphenylsiloxane and dimethylsiloxane, vinyl-terminated copolymer of methyl(3,3,3-trifluoropropyl)siloxane and dimethylsiloxane, and vinyl-terminated copolymer of methyl(3,3,3-trifluoropropyl)siloxane and dimethylsiloxane. Typically, if a vinyl-terminated silicone rubber comprises both a vinyl termination and a hydroxyl termination, if is considered part of the rubber component of this invention.

Crosslinking Catalyst

Cure (crosslinking) of a silanated graft is promoted with a crosslinking catalyst (sometimes referred to as a crosslinking agent), and any catalyst that will effectively promote the crosslinking of the Si-g-ethylene-α-olefin elastomer can be used. These catalysts generally include acids and bases, and organometallic compounds, including organic titanates, organic zirconates, and complexes or carboxylates of lead, cobalt, iron, nickel, zinc and tin.

Dibutyltin dilaurate, dioctyltin maleate, dibutyltin diacetate, dibutyltin dioctoate, stannous acetate, stannous octoate, lead naphthenate, zinc caprylate, cobalt naphthenate, and the like, can be used. The amount of catalyst will depend on the particular system at issue.

In certain embodiments, dual crosslinking systems, which use a combination of radiation, heat, moisture and/or crosslinking steps, may be effectively employed. For instance, it may be desirable to employ peroxide crosslinking agents in conjunction with silane crosslinking agents, peroxide crosslinking agents in conjunction with radiation, or sulfur-containing crosslinking agents in conjunction with silane crosslinking agents. Dual crosslinking systems are disclosed in U.S. Pat. Nos. 5,911,940 and 6,124,370.

Ethylene-α-Olefin Elastomer

In one embodiment the ethylene-α-olefin elastomer component of the composition of this invention is the same as the pre-grafted ethylene-α-olefin elastomer described above.

In one embodiment the ethylene-α-olefin elastomer component of the composition of this invention is an ethylene-propylene-diene monomer (EPDM). The EPDM includes units derived from ethylene. The EPDM also includes units derived from propylene. Olefin other than and/or in addition to propylene may be utilized in the EPDM. Nonlimiting examples of suitable other olefins for mixture with ethylene include one or more $C_{4-30}$ or $C_{4-20}$ or $C_{4-12}$ aliphatic-, cycloaliphatic- or aromatic-compounds (comonomers) containing one or more ethylenic unsaturations. Examples include aliphatic-, cycloaliphatic- and aromatic olefins such as isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, vinyl cyclohexane, styrene, cyclopentene, cyclohexene, cyclooctene, and mixtures.

The EPDM includes units derived from a diene. The diene can be conjugated-, non-conjugated-, straight chain-, branched chain- or cyclic-hydrocarbon diene having from 6 to 15 carbon atoms. Nonlimiting examples of suitable diene include 1,4-hexadiene; 1,6-octadiene; 1,7-octadiene; 1,9-decadiene; branched chain acyclic diene, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5 sopropylidene-2-norbornene, 5-(4-cyclopentenyl)-2-norbornene, 5-cyclohexylidene-2-norbornene, 5-vinyl-2-norbornene, norbornadiene, 1,4-hexadiene (HD), 5-ethylidene-2-norbornene (ENB), 5-vinylidene-2-norbornene (VNB), 5-methylene-2-norbornene (MNB), and dicyclopentadiene (DCPD). In one embodiment the diene is selected from VNB and ENB. In one embodiment the diene is butadiene.

In one embodiment the ethylene-α-olefin elastomer component of the composition of this invention comprises both an EPDM and an ethylene-α-olefin elastomer as previously described.

Additives and Fillers

The compositions and articles of this invention may also contain additives. Representative additives include but are not limited to antioxidants, cross linking co-agents, cure boosters and scorch retardants, processing aids, coupling agents, ultraviolet stabilizers (including UV absorbers), antistatic agents, nucleating agents, slip agents, plasticizers (particularly plasticizer oil), lubricants, viscosity control agents, tackifiers, anti-blocking agents, surfactants, extender oils, acid scavengers, flame retardants and metal deactivators. These additives are typically used in a conventional manner and in conventional amounts, e.g., from 0.01 wt % or less to 20 wt % or more based on the weight of the composition.

Scorch inhibitors include 2,2,6,6-tetramethylpiperidinoxyl (TEMPO) and 4-hydroxy-2,2,6,6-tetramethylpiperidinoxyl (4-hydroxy TEMPO). Suitable UV light stabilizers include hindered amine light stabilizers (HALS) and UV light absorber (UVA) additives. Representative UVA additives include benzotriazole types such as TINUVIN 326 and TINUVIN 328 commercially available from Ciba, Inc. Blends of HALS and UVA additives are also effective. Examples of antioxidants include hindered phenols such as tetrakis[methylene(3,5-di-tert-butyl-4-hydroxyhydro-cinnamate)]methane; bis[(beta-(3,5-ditert-butyl-4-hydroxybenzyl)methyl-carboxy-ethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethyl ene bis(3,5-di-tert-butyl-4-hydroxy)-hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis-(alpha,alpha-dimethylbenzyl)-diphenylamine, diphenyl-p-phenylenediamine, mixed di-aryl-p-phenylenediamines, and other hindered amine anti-degradants or stabilizers. Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; and nonionic surfactants.

The compositions and articles of this invention may also contain filler, either conductive or nonconductive. Representative fillers include but are not limited to the various metal oxides and hydroxides, e.g., titanium dioxide, zinc oxide, magnesium hydroxide, potassium hydroxide and aluminum trihydroxide; metal carbonates such as magnesium carbonate and calcium carbonate; metal sulfides and sulfates such as molybdenum disulfide and barium sulfate; metal borates such as barium borate, meta-barium borate, zinc borate and meta-zinc borate; metal anhydride such as aluminum anhydride; silicates, carbon black, talc, clay such as diatomite, kaolin and montmorillonite; huntite; celite; asbestos; ground minerals; and lithopone. These fillers are typically used in a conventional manner and in conventional amounts, e.g., from 5 wt % or less to 50 wt % or more based on the weight of the composition.

Cold Shrink Compositions

In one embodiment the cold shrink composition comprises based on the weight of the composition:
  (A) 0.5 to 30, or 1 to 20, or 3 to 10 wt % of a blend of silane-grafted ethylene-α-olefin elastomer and a hydroxyl-terminated polyorganosiloxane;
  (B) 70 or more, or greater than 70 to 95, or 75 to 90, or 78 to 85, wt % vinyl-terminated silicone rubber;
  (C) 0.001 to 5, or 0.005 to 2, or 0.1 to 1, wt % crosslinking catalyst;
  (D) 0.5 to 50, or 1 to 40, or 5 to 35, wt % ethylene-α-olefin elastomer; and
  (E) Optionally one or more of an additive and filler.

In one embodiment the cold shrink composition further comprises, based on the weight of the composition, from greater than zero to 40, or 1 to 38 or 5 to 35, wt % of a filler.

In one embodiment the cold shrink composition further comprises, based on the weight of the composition, from greater than zero to 20, or 0.001 to 10 or 0.5 to 5, wt % of at least one additive.

In one embodiment the cold shrink composition comprises an additive selected from the group consisting of antioxidants, cross linking co-agents, cure boosters and scorch retardants, processing aids, coupling agents, ultraviolet stabilizers, antistatic agents, nucleating agents, slip agents, plasticizers, lubricants, viscosity control agents, tackifiers, anti-blocking agents, surfactants, extender oils, acid scavengers, flame retardants, metal deactivators and mixtures thereof.

Compounding

Compounding of the compositions can be effected by standard equipment known to those skilled in the art. Examples of compounding equipment are internal batch mixers, such as a BANBURY™ or BOLLING™ internal mixer. Alternatively, continuous single, or twin screw, mixers can be used, such as FARREL™ continuous mixer or a HAAKE™ mixer, a WERNER and PFLEIDERER™ twin screw mixer, or a BUSS™ kneading continuous extruder. The type of mixer utilized, and the operating conditions of the mixer, will affect properties of the composition such as viscosity, volume resistivity, and extruded surface smoothness.

In one embodiment (A) the blend of silane-grafted ethylene-α-olefin elastomer and a hydroxyl-terminated polyorganosiloxane, (B) vinyl-terminated silicone rubber, (C) crosslinking catalyst, (D) vinyl-terminated silicone rubber, and (E) filler and/or additives, if any, are mixed, typically in the described sequence, in appropriate compounding equipment to obtain a homogeneous mixture taking care not to induce premature crosslinking. The homogeneous mixture is then formed into the desired shape by extrusion or molding, and then cured (or at least partially cured). If a molded article, typically it is at least partially cured in the mold. The article is then typically degassed, removed from the mold (if molded), stretched to the desired size, and held in the stretched state by mechanical means, e.g., plastic spiral core, until ready for use. In one embodiment the article continues to cure after the completion of the extrusion or molding operation.

Articles

In one embodiment the invention is a cable accessory. In one embodiment the invention is a cold shrink splice or termination in the form of a sleeve or tube. In one embodiment the invention is a cold shrink splice. In one embodiment the invention is a cold shrink splice made from a composition comprising:

(A) 0.5 to 30, or 1 to 20, or 3 to 10 wt % of a blend of silane-grafted ethylene-α-olefin elastomer and a hydroxyl-terminated polyorganosiloxane;
(B) 70 or more, or greater than 70 to 95, or 75 to 90, or 78 to 85, wt % vinyl-terminated silicone rubber;
(C) 0.001 to 5, or 0.005 to 2, or 0.1 to 1, wt % crosslinking catalyst;
(D) 0.5 to 50, or 1 to 40, or 5 to 35, wt % ethylene-α-olefin elastomer; and
(E) Optionally one or more of an additive and filler.

In one embodiment the invention is a cold shrink article comprising a shaped, stretched and cured composition comprising (i) a blend of silane-grafted ethylene-α-olefin elastomer and a hydroxyl-terminated polyorganosiloxane, (ii) a vinyl-terminated silicone rubber, and (iii) an ethylene-α-olefin elastomer. In one embodiment the invention is a cable having an external layer and comprising a cold shrink splice, the splice shrunk about and in contact with the external layer of the cable and comprising a shaped and cured composition, the composition comprising (i) a blend of silane-grafted ethylene-α-olefin elastomer and a hydroxyl-terminated polyorganosiloxane, (ii) a vinyl-terminated silicone rubber, and (iii) an ethylene-α-olefin elastomer.

EXAMPLES

Test Methods

Tear Die B is reported in kiloNewtons per meter (kN/m), and it is measured by ASTM D624 Type B. Tear tests are conducted on an INSTRON™ 5565 tester at a speed of 500 millimeters per minute (mm/min).

Tensile Strength is reported in MegaPascals (MPa), and it is measured in accordance with ASTM D638 Type 4. Tensile tests are conducted on an INSTRON™ 5565 tensile tester at a speed of 500 mm/min.

Tensile Elongation is reported as a percent over the original length of the sample, and it is measured in accordance with ASTM D638 Type 4. Tensile tests are conducted on an INSTRON™ 5565 tensile tester at a speed of 500 mm/min.

M100 is chosen as a measure of flexibility, and it is calculated as the modulus at 100% strain. M100 is reported in MegaPascals (MPa).

Tensile Set, or Tensile Permanent Set, is measured by a procedure in which reported one to three unstretched and conditioned specimens are placed in the clamps of the tension set apparatus. The specimen(s) are placed in the grips of the testing machine, using care to adjust the specimen symmetrically to distribute tension uniformly over the cross section. The Tension Set apparatus is set to 100% elongation and verified using a caliper. The specimens are placed in an oven at a temperature of 100° C. for 22 hours and removed to room temperature (23° C.) for 10 minutes. The samples are then removed from the Tension Set apparatus. After 10 minutes, the distance between the marked gauges is measured. Tensile set is calculated according to the following equation $$S = 100(D-G)/G$$

wherein S is the tension set in percent, D is the distance between the gauge marks (post set), and G is the original distance between gauge marks, or 1.0 inch (25.4 mm).

AC Breakdown Strength is reported in kilovolts per millimeter (kV/mm). The alternating current breakdown strength (ACBD) is measured on HIPOTRONICS (model 775-5-D149-P-B) at room temperature with a voltage increasing speed of 1kilovolt per second (kV/s).

Dissipation Factor (DF) at 90° C. are measured at 90° C. on a Q30 series instrument with a frequency of 50 hertz (Hz) and the voltage of 1 kV. Before the test, sample sheets are pre-treated in a 60° C. in an oven for 5 days under 0.07-0.09 MPa vacuum.

Materials

SILASATIC™ GP-30 is a vinyl-terminated, peroxide-curable, silicone rubber gum available from Dow Corning.

VTMS-g-ENGAGE/OH-PDMS is a silane grafted blend (45.5 wt. % ENGAGE™ 8200 and 45.5 wt. % ENGAGE™ 7467) made on a ZSK-30 twin-screw extruder, using a total silane content of 2 wt %, resulting in an actual grafting level of 1.5 wt. %; and the PDMS-OH content is 5 wt %. ENGAGE™ 8200 (5 MI, 0.870 density) is an ethylene-octene copolymer, and ENGAGE™ 7467 (1 MI, 0.860 density) is an ethylene-butene copolymer, both resins from the Dow Chemical Company.

DBTDL is dibutyltin dilaurate.

NORDEL IP 4520 is an amorphous ethylene-propylene-diene terpolymer (EPDM) available from The Dow Chemical Company.

PEROXIDE L-101 is 2,5-dimethyl-2,5-di(butyl peroxy) hexane.

Compositions, Procedure and Results

The compositions are compounded in HAAKE™ mixer set a temperature of 80° C. Mixing time is 10 minutes with a rotor speed of 60 revolutions per minute (rpm). Plaques are made by compression molding and cured in the press at 170° C. for 10 minutes. The compositions and test results are reported in the Table.

TABLE

Compositions and Test Results

|  | Comparative Example 1 | Comparative Example 2 | Inventive Example 1 | Inventive Example 2 | Inventive Example 3 |
|---|---|---|---|---|---|
| Silicone Rubber (SILASATIC GP-30) | 100 | 70 | 80 | 70 | 70 |
| VTMS-g-ENGAGE/OH-PDMS Blend |  |  | 20 | 5 | 4.95 |
| DBTDL Catalyst MB |  |  |  |  | 0.05 |
| EPDM Nordel IP 4520 |  | 30 |  | 25 | 25 |
| Peroxide L-101 | 1 | 1 | 0.8 | 1 | 1 |
| Total (phr) | 101 | 101 | 100.8 | 101 | 101 |
| Tear Die B, kN/m | 31.3 | 22.1 | 46.7 | 34.9 | 35.3 |
| Tensile Strength, MPa | 4.5 | 4.44 | 6 | 5.8 | 6.3 |
| Tensile Elongation, % | 504 | 447 | 548 | 425 | 481 |
| M100 (MPa) | 0.63 | 0.76 | 0.92 | 0.85 | 0.81 |
| Tensile Set, % | <5 | <5 | 29.8 | 6.6 | 6.8 |
| AC Breakdown Strength, kV/mm | 22.6 | 19.6 | 26.4 | 28.8 | 30.7 |
| DF at 90 C., % | 3.7 | 2.45 | 2.53 | 3.87 | 2.81 |

CE 1 shows the typical properties of a peroxide cross-linked silicone rubber with generally excellent tensile recovery as shown by the low tension set, but exhibiting low tensile, tear and dielectric breakdown strength. CE 2 shows the impact of blending an olefin elastomer (EPDM) with the silicone rubber then crosslinking with peroxide. Given the incompatibility of the two materials, the data shows no synergy in the approach, resulting in inferior mechanical properties of the blend. Moreover, the dielectric strength is not improved.

IE 1-IE 3 represent the invention showing reactive blend approaches for improved properties and ability to balance excellent tensile strength, higher tear resistance and higher dielectric strength along with good elastic recovery, suitable for a cold shrink electrical application. Note, due to the tension set requirement for the application, the composition space for the invention uses a relatively high amount of the silicone phase (Si-rubber content of the composition is 70% or more), essentially modifying the silicone rubber to improve the desired properties; unlike WO2006007268A where the Si-rubber content of the composition is in the range of 5-70%.

What is claimed is:

1. A cold shrink article comprising a shaped, stretched and cured composition comprising (i) a blend of silane-grafted ethylene-α-olefin elastomer and a hydroxyl-terminated polyorganosiloxane, (ii) a vinyl-terminated silicone rubber, and (iii) an ethylene-α-olefin elastomer.

2. A cable having an external layer and comprising a cold shrink splice, the splice shrunk about and in contact with the external layer of the cable and comprising a shaped and cured composition, the composition comprising (i) a blend of silane-grafted ethylene-α-olefin elastomer and a hydroxyl-terminated polyorganosiloxane, (ii) a vinyl-terminated silicone rubber, and (iii) an ethylene-α-olefin elastomer.

* * * * *